(12) United States Patent
Lin et al.

(10) Patent No.: US 7,408,170 B2
(45) Date of Patent: Aug. 5, 2008

(54) ULTRAVIOLET DETECTOR

(75) Inventors: Cha-Hsin Lin, Tainan (TW);
Lurng-Shehng Lee, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 38 days.

(21) Appl. No.: 11/308,373

(22) Filed: Mar. 20, 2006

(65) Prior Publication Data
US 2007/0170366 A1    Jul. 26, 2007

(30) Foreign Application Priority Data
Jan. 24, 2006  (TW) .............................. 95102578 A

(51) Int. Cl.
*G01J 1/42*    (2006.01)
(52) U.S. Cl. ..................................................... 250/372
(58) Field of Classification Search .................. 250/372
See application file for complete search history.

(56) References Cited

U.S. PATENT DOCUMENTS

| | | | | |
|---|---|---|---|---|
| 4,614,961 A | | 9/1986 | Khan et al. ................. 257/453 |
| 5,677,538 A | * | 10/1997 | Moustakas et al. ..... 250/370.12 |
| 6,410,940 B1 | | 6/2002 | Jiang et al. ..................... 257/82 |
| 7,164,187 B2 | * | 1/2007 | Nagasawa ................... 257/617 |
| 2005/0012113 A1 | * | 1/2005 | Sheu et al. ................... 257/184 |
| 2005/0161698 A1 | * | 7/2005 | Takayama et al. ........... 257/103 |

* cited by examiner

*Primary Examiner*—David P. Porta
*Assistant Examiner*—Marcus H Taningco
(74) *Attorney, Agent, or Firm*—Jianq Chyun IP Office

(57) ABSTRACT

An ultraviolet detector (UV-detector) including a substrate, a first electrode, and a second electrode is provided. The UV-detector substrate comprises an active region for absorbing ultraviolet light and generating charges. The first electrode is electrically connected to the active region and has a plurality of first tips. Additionally, the second electrode is electrically connected to the active region and has a plurality of second tips. The second electrode is electrically insulated from the first electrode. The first and second tips facilitate the conduction of the charge generated by the photoelectric effect, and the sensitivity of the UV-detector is thus enhanced.

18 Claims, 11 Drawing Sheets

ULTRAVIOLET DETECTOR

CROSS-REFERENCE TO RELATED APPLICATION

This application claims the priority benefit of Taiwan application serial no. 95102578, filed on Jan. 24, 2006. All disclosure of the Taiwan application is incorporated herein by reference.

BACKGROUND OF THE INVENTION

1. Field of the Invention

The present invention relates to an ultraviolet detector (UV-detector), and more particularly to a UV-detector capable of quickly and effectively conducting the charge generated by the UV-detector.

2. Description of Related Art

In recent years, with the flourishing development of global industry, the problem of environmental pollution has become increasingly worse, and the problem of holes in the ozonosphere has become great concern and focus of attention. The ozonosphere can absorb the ultraviolet light of sunlight, and therefore ultraviolet light would pass through holes in the ozonosphere and impinges the earth causing many adverse effects to human beings. Relevant medical research has proved that ultraviolet light leads to diseases such as skin cancer, cataracts, etc. Additionally, most women are quite concerned about health and color of their skin. Human skin is likely to undergo pathological changes like developing black spots, etc, besides darkening, due to overexposure to ultraviolet light. Therefore, how to enable people find out the ultraviolet light intensity of their outdoor environment "in real time", so as to take proper protection measures, is a rather an important issue.

A common ultraviolet detector (UV-detector) is disclosed in U.S. Pat. No. 4,614,961 and U.S. Pat. No. 6,410,940. Taking U.S. Pat. No. 4,614,961 to Khan et al. as an example, the AlN epitaxial layer and the $Al_xGa_{1-x}N$ epitaxial layer are mainly manufactured on a sapphire substrate through metal organic chemical vapor deposition (MOCVD). As the substrate used is a sapphire substrate, and the epitaxial layers are manufactured through MOCVD, the manufacturing cost of the UV-detector disclosed in U.S. Pat. No. 4,614,961 is relatively high. Taking U.S. Pat. No. 6,410,940 to Jiang et al. as an example, the ultraviolet detector is mainly manufactured using GaN-based materials, and a sapphire substrate is also used, thus the manufacturing cost of the UV-detector is also relatively high.

It can be known from what has been mentioned above that, since the current UV-detector still faces the problem of excessively high manufacturing costs, most current portable electronics have not been equipped with ultraviolet detectors for a user to use anytime, anywhere. Accordingly, how to effectively reduce the manufacturing cost has become an important issue to be solved for the UV-detector.

SUMMARY OF THE INVENTION

An object of the present invention is to provide an ultraviolet detector (UV-detector) capable of quickly and effectively conducting charges generated by photoelectric effects.

Another object of the present invention is to provide a UV-detector, wherein an active layer covers the electrode for enhancing the sensitivity of the UV-detector.

To achieve the above-mentioned or other objects, the present invention provides a UV-detector including a substrate, a first electrode, and a second electrode. The substrate has an active region for absorbing ultraviolet light and generating charges. The first electrode is electrically contacted to the active region of the substrate and has a plurality of first tips. Additionally, the second electrode is electrically connected to the active region of the substrate and has a plurality of second tips. The second electrode is electrically insulated from the first electrode.

In an embodiment of the present invention, the first and second electrodes mentioned above are disposed on a surface of the substrate. Additionally, the first and second electrodes may also be embedded in the substrate.

In an embodiment of the present invention, the substrate mentioned above includes silicon, germanium, indium phosphide, gallium arsenide, or silicon carbide (e.g., 6H—SiC).

In an embodiment of the present invention, the first electrode mentioned above comprises a spiral-shaped electrode having the first tips, and the second electrode comprises a spiral-shaped electrode having second tips.

In an embodiment of the present invention, the first electrode mentioned above includes a plurality of ring-shaped electrodes electrically connected to each other and have the first tips, and the second electrode includes a plurality of ring-shaped electrodes electrically connected to each other and have the second tips.

In an embodiment of the present invention, the first electrode mentioned above comprises a finger-shaped electrode having the first tips, and the second electrode comprises a finger-shaped electrode having the second tips.

In an embodiment of the present invention, the UV-detector may further include an anti-reflection coating for covering the substrate, the first electrode and the second electrode. Additionally, the UV-detector may further include a filter disposed on the anti-reflection coating.

To achieve the above-mentioned or other objects, the present invention provides another UV-detector including a substrate, a first electrode, a second electrode, and an active layer. The first electrode is disposed on the substrate and has a plurality of first tips. The second electrode is disposed on the substrate and has a plurality of second tips. The second electrode is electrically insulated from the first electrode. Additionally, the active layer is disposed on the substrate, and is electrically connected to the first and second electrodes. The active layer is suitable for absorbing ultraviolet light and generating charges.

In an embodiment of the present invention, the substrate mentioned above includes silicon, germanium, indium phosphide, gallium arsenide, or silicon carbide. Additionally, the material of the active layer may be the same as that of the substrate.

In an embodiment of the present invention, the active layer mentioned above covers the substrate, the first electrode, and the second electrode.

In an embodiment of the present invention, the first and second electrodes mentioned above cover the active layer. Additionally, the first and second electrodes may also be embedded in the active layer.

In an embodiment of the present invention, the first electrode mentioned above comprises a spiral-shaped electrode having the first tips, and the second electrode comprises a spiral-shaped electrode and has the second tips.

In an embodiment of the present invention, the first electrode mentioned above includes a plurality of ring-shaped electrodes electrically connected to each other and have the first tips, and the second electrode includes a plurality of ring-shaped electrodes electrically connected to each other and have the second tips.

In an embodiment of the present invention, the first electrode mentioned above comprises a finger-shaped electrode having the first tips, and the second electrode comprises a finger-shaped electrode having the second tips.

In an embodiment of the present invention, the UV-detector may further include an anti-reflection coating disposed on the active layer. Additionally, the UV-detector may further include a filter disposed on the anti-reflection coating.

Since the present invention employs an electrode having tips so as to quickly and effectively conduct the charge generated by the UV-detector, and therefore the UV-detector of the present invention has desirable sensitivity.

In order to make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
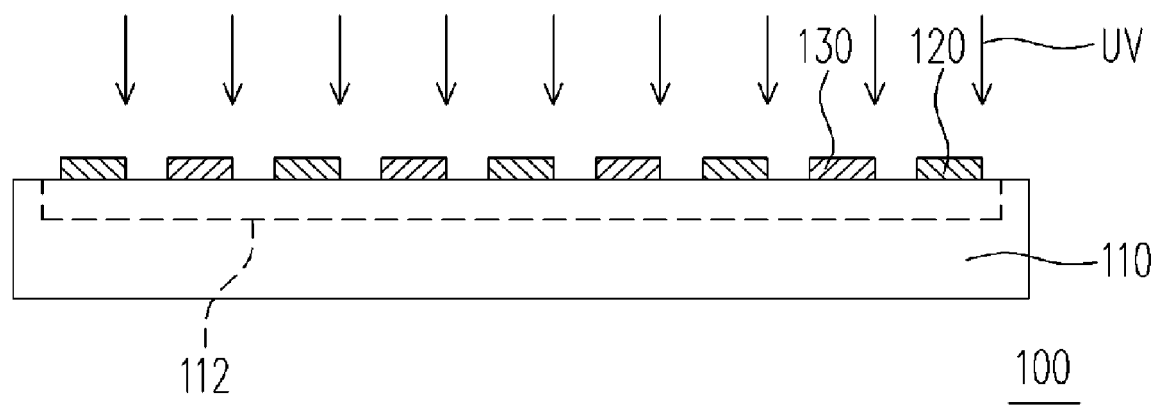
FIG. 1 is a schematic cross-sectional view of a UV-detector according to a first embodiment of the present invention.
Figure 2A:
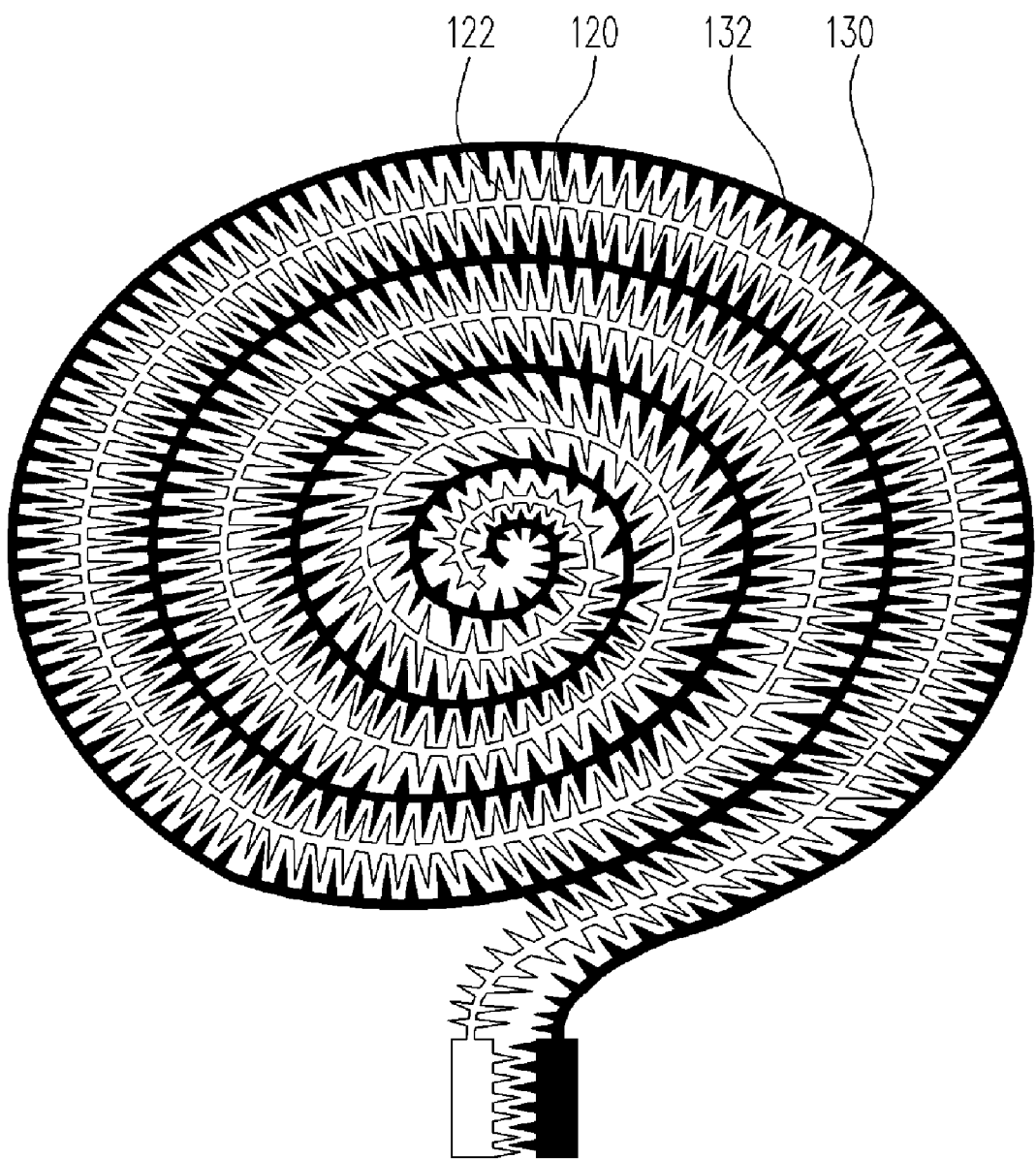
FIGS. 2A-2C are schematic top views of different first and second electrodes respectively according to an embodiment of the present invention.
Figure 2B:
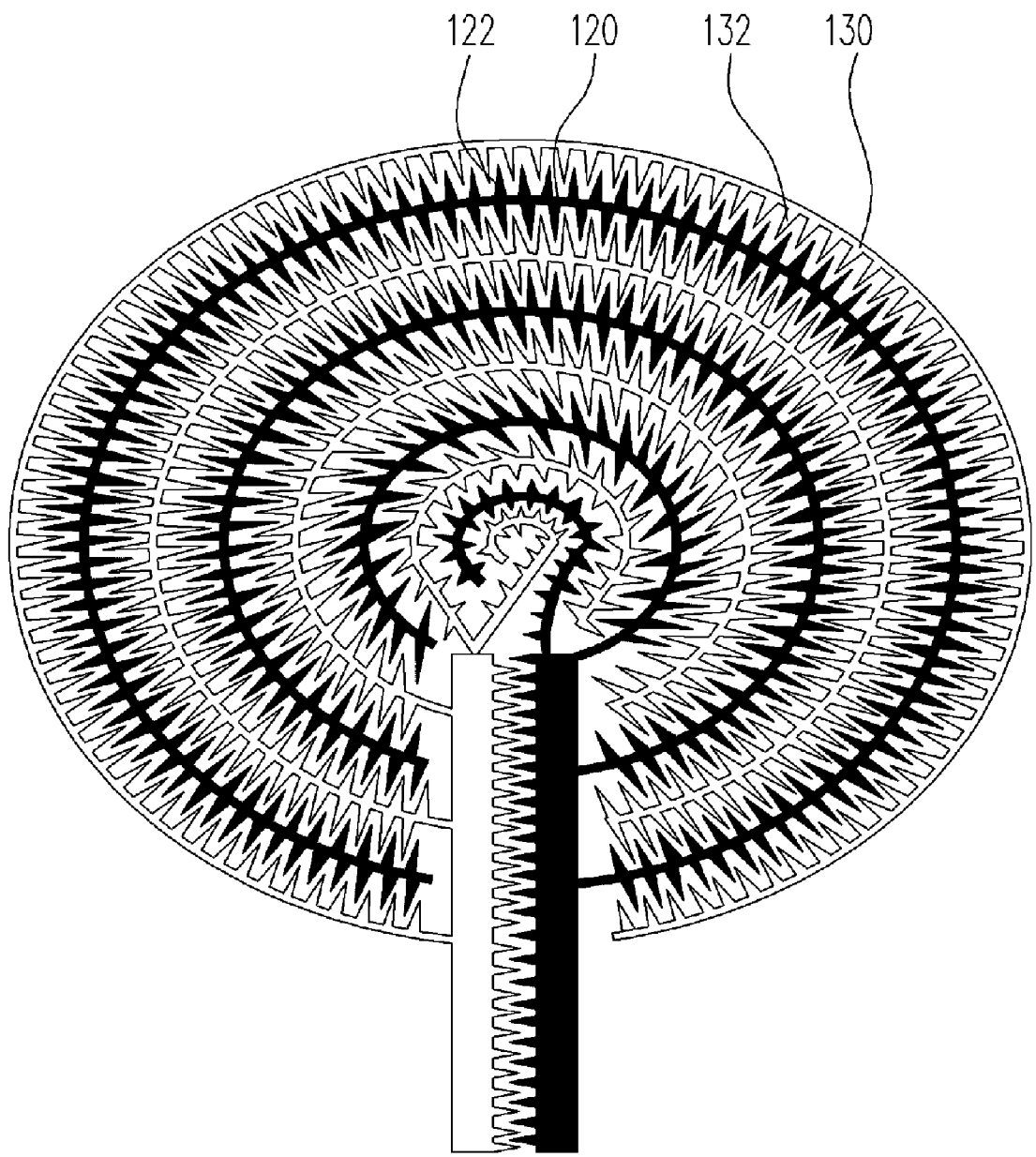
Figure 2C:
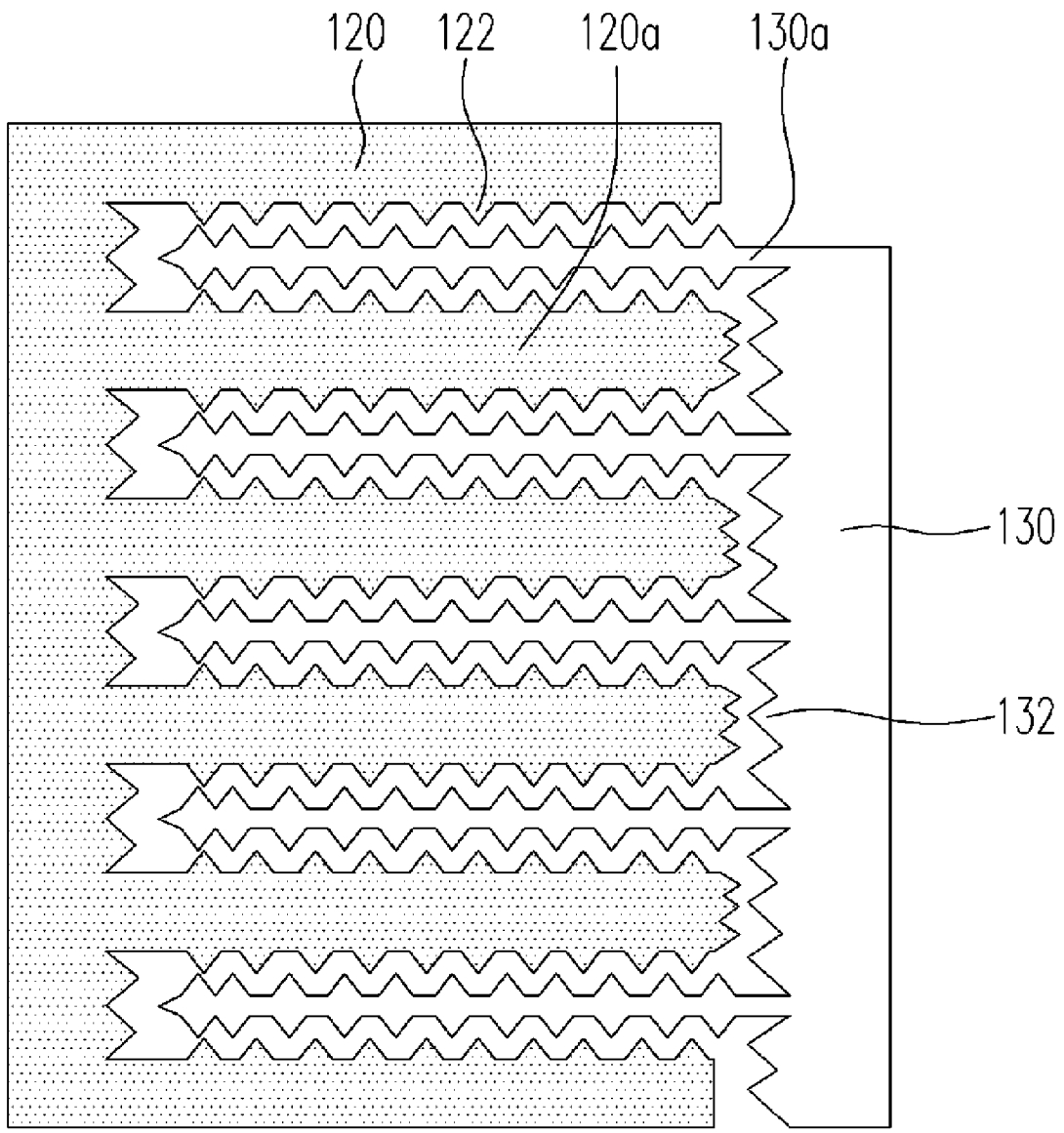

FIG. 1 is a schematic cross-sectional view of an ultraviolet detector (UV-detector) according to a first embodiment of the present invention, and FIGS. 2A to 2C are schematic top views of different first and second electrodes respectively. Referring to FIG. 1 and FIGS. 2A to 2C, a UV-detector 100 of the present invention includes a substrate 110, a first electrode 120, and a second electrode 130. The substrate 100 has an active region 112 for absorbing ultraviolet light (UV) and generating charges. The first electrode 120 is electrically connected to the active region 112 of the substrate 110, and has a plurality of first tips 122 (shown in FIGS. 2A to 2C). Additionally, the second electrode 130 is electrically connected to the active region 112 of the substrate 110, and has a plurality of second tips 132 (shown in FIGS. 2A to 2C). The second electrode 130 is electrically insulated from the first electrode 120.

The substrate 110 comprises, for example, silicon, germanium, indium phosphide, gallium arsenide, or silicon carbide, e.g., 6H—SiC. It should be noted that, the material of substrate 110 mentioned above is used only for illustration, and is not intended to limit the scope of the present invention. In other words, the material of substrate 110 may be comprised of any photoelectric material capable of absorbing UV and generating charges.

According to an embodiment of the present invention an active region 112 may be formed in the substrate 110 for detecting UV. More particularly, the active region 112 may be comprised of photoelectric elements, such as, the photo-conductor, the photo-transistor, the photo-diode, etc. and may be formed by using a semiconductor process technique, such as N-type or P-type ion-implantation, annealing, etc. However, the configuration of the active region 112 mentioned above is used only for demonstration and illustration, and is not intended to limit the scope of the present invention.

As shown in FIG. 1, the first electrode 120 and the second electrode 130 of this embodiment are disposed on the surface of the substrate 110 and electrically connected to the active region 112. When the UV light is irradiated on the UV-detector 100, some charges, including positive charges and negative charges, are generated in the active region 112 due to photoelectric effects. The amount of these charges reflects the intensity of ultraviolet light incident on the active region 112. When the active region 112 is irradiated by the UV light and generates charges, the first electrode 120 and the second electrode 130 will respectively absorb and conduct these charges with different electrical properties. As can be known from the above measuring mechanism, the design of the first electrode 120 and the second electrode 130 is relatively important for the absorption and conduction of charges. If the electrodes are improperly designed, the positive and negative charges in the active region 112 will possibly be re-combined, which deteriorates the precision of the measurement. According to this embodiment tips 122 and 132 are disposed on the first electrode 120 and the second electrode 130 respectively so that charges generated in the active region 112 can be absorbed and conducted quickly and effectively. The first electrode 120 and the second electrode 130 of the present invention will be described in detail below with reference to FIGS. 2A to 2C.

Referring to FIG. 2A, the first electrode 120 of this embodiment is a spiral-shaped electrode with first tips 122, and the second electrode 130 is also a spiral-shaped electrode with second tips 132. It should be noted that, the degree of protrusion of the first tips 122 obeys the principle of not contacting the adjacent second electrode 130; also, the degree of protrusion of the second tips 132 obeys the principle of not contacting the adjacent first electrode 120. As the first tips 122 and the second tips 132 have relatively strong capability of absorbing charges with different electrical properties, the re-combination of positive and negative charges in the active region 112 is restrained.

In view of the above, conditions of spiral-shaped electrodes in FIG. 2A, such as, number of spiral circles, spiral direction (clockwise or anti-clockwise), distance between electrodes, etc. can be properly adjusted according to actual requirements.

Next, referring to FIG. 2B, the first electrode 120 of this embodiment includes a plurality of ring-shaped electrodes, e.g., C-shaped ring-shaped electrode, electrically connected with each other and having first tips 122. The second electrode 130 includes a plurality of ring-shaped electrodes, e.g., C-shaped ring-shaped electrode, electrically connected with each other and having second tips 132. It should be noted that, the degree of protrusion of the first tips 122 obeys the principle of not contacting the adjacent second electrode 130; also, the degree of protrusion of the second tips 132 obeys the principle of not contacting the adjacent first electrode 120.

In view of the above, conditions of ring-shaped electrodes in FIG. 2B such as, the number of ring-shaped electrodes, distance between ring-shaped electrodes, direction of the notch of C-shaped ring-shaped electrodes, etc. can be properly adjusted according to actual requirements.

Next, referring to FIG. 2C, the first electrode 120 of this embodiment is a finger-shaped electrode with first tips 122, and the second electrode 130 is a finger-shaped electrode with second tips 132. It should be noted that, the degree of protrusion of the first tips 122 obeys the principle of not contacting the adjacent second electrode 130; also, the degree of protrusion of the second tips 132 obeys the principle of not contacting the adjacent first electrode 120. More particularly, the first electrode 120 has a plurality of finger portions 120a, and the second electrode 130 has a plurality of finger portions 130a, and each of the finger portions 130a is located between two adjacent finger portions 120a.

In view of the above, conditions of finger-shaped electrodes in FIG. 2C, such as, number of finger portions, length of finger portions, width of finger portions, distance between finger-shaped electrodes, etc. can be properly adjusted according to actual requirements.

Figure 3:
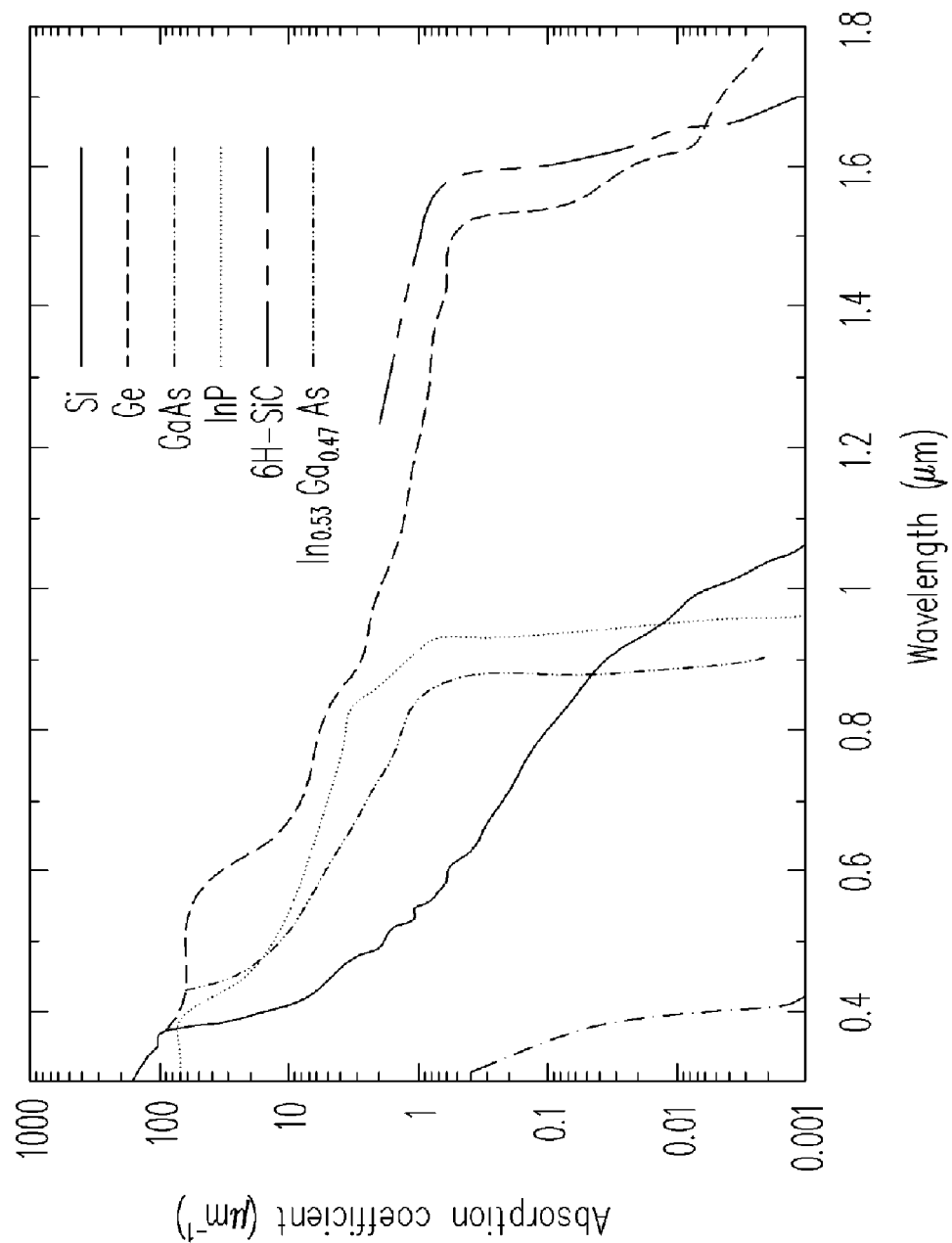
FIG. 3 is a graph of the absorption coefficient of different substrates for light rays of different wavelengths.

Desirable design of electrode not only can reduce probability of re-combination of positive and negative charges in the active region 112, but also solve the problem of short penetration depth of ultraviolet light. More particularly, since active regions 112 made of different materials have different absorption coefficients for UV, when they are irradiated by UV with the same intensity, the UV has different penetration depths in substrates 110 made of different materials. FIG. 3 is a graph of the absorption coefficient of different substrates for light rays with different wavelengths. As shown in FIG. 3, silicon substrate, germanium substrate, indium phosphide substrate, gallium arsenide substrate, and 6H—SiC substrate all absorb ultraviolet light (the wavelength is between 100 nanometer and 420 nanometer), and silicon substrate, germanium substrate, indium phosphide substrate, and gallium arsenide substrate have relatively stronger absorption capability for ultraviolet light (high absorption coefficient). In other words, the penetration depth of ultraviolet light in silicon substrate, germanium substrate, indium phosphide substrate, and gallium arsenide substrate is only about $10^{-3}$ micron.

In the circumstance of such a shallow penetration depth, electrodes with tips as shown in FIGS. 2A to 2C according to the present invention can still absorb and conduct charges quickly and effectively. However, the present invention is not limited to the electrodes with tips must be used together with a substrate with a high absorption coefficient for ultraviolet light, and the electrode may also used together with a substrate with lower absorption coefficient for ultraviolet light (such as, 6H—SiC substrate, aluminium oxide substrate, sapphire substrate, etc.), thus further enhancing the performance of the UV-detector.

To increase the irradiation area of UV-detector 100, the present invention may choose conductor materials with high penetration rates for ultraviolet light to manufacture the first electrode 120 and the second electrode 130. In a preferred embodiment of the present invention, the first electrode 120 and the second electrode 130 are made of an Au/Ti composite metal layer or a Ni/Au composite metal layer.

Second Embodiment

Figure 4A:
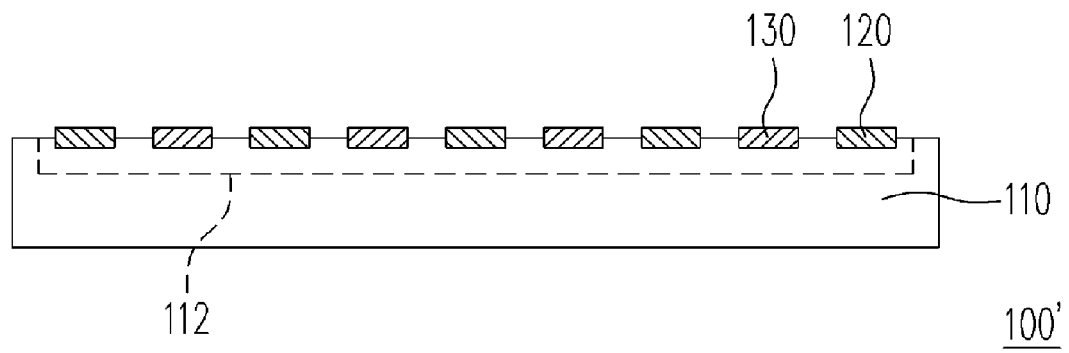
FIGS. 4A and 4B are schematic cross-sectional views of a UV-detector according to a second embodiment of the present invention.
Figure 4B:
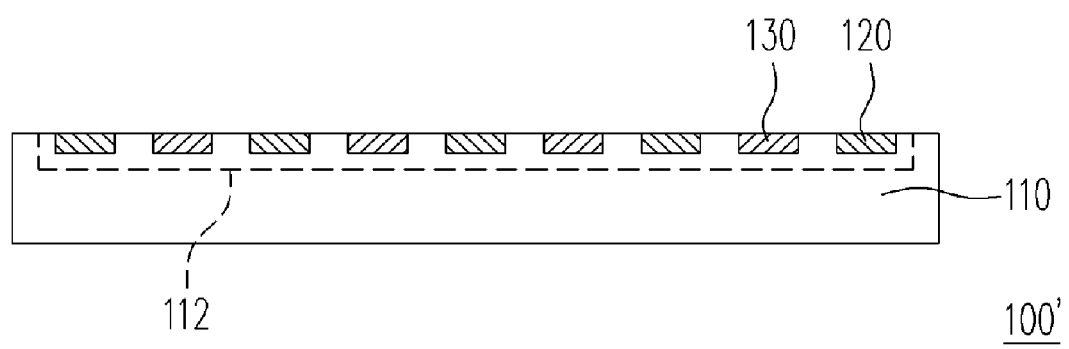

FIGS. 4A and 4B are schematic cross-sectional views of a UV-detector according to a second embodiment of the present invention. First referring to FIGS. 4A and 4B, the UV-detector 100' of this embodiment is similar to the UV-detector 100 of the first embodiment except for the first electrode 120 and the second electrode 130 are embedded in the active region 112 of the substrate 110 to facilitate the absorption and conduction of positive and negative charges. As shown in FIG. 4A, only a part of the first electrode 120 and the second electrode 130 is embedded in the active region 112 of the substrate 110; certainly, the first electrode 120 and the second electrode 130 of this embodiment can also be completely embedded in the active region 112 of the substrate 110, with only its upper surface being exposed to the surface of the substrate 110, as shown in FIG. 4B.

It should be noted that, the first electrode 120 and the second electrode 130 of this embodiment can be designed as that of FIGS. 2A and 2B. Additionally, this embodiment is also not limited to that the first electrode 120 and the second electrode 130 embedded in the substrate 110 must be used together with a substrate with a high absorption coefficient for ultraviolet light. The electrode of this embodiment can be used together with a substrate with a lower absorption coefficient for ultraviolet light (such as 6H—SiC substrate, aluminium oxide substrate, sapphire substrate, etc.), thus further enhancing the performance of the UV-detector.

Third Embodiment

Figure 5:
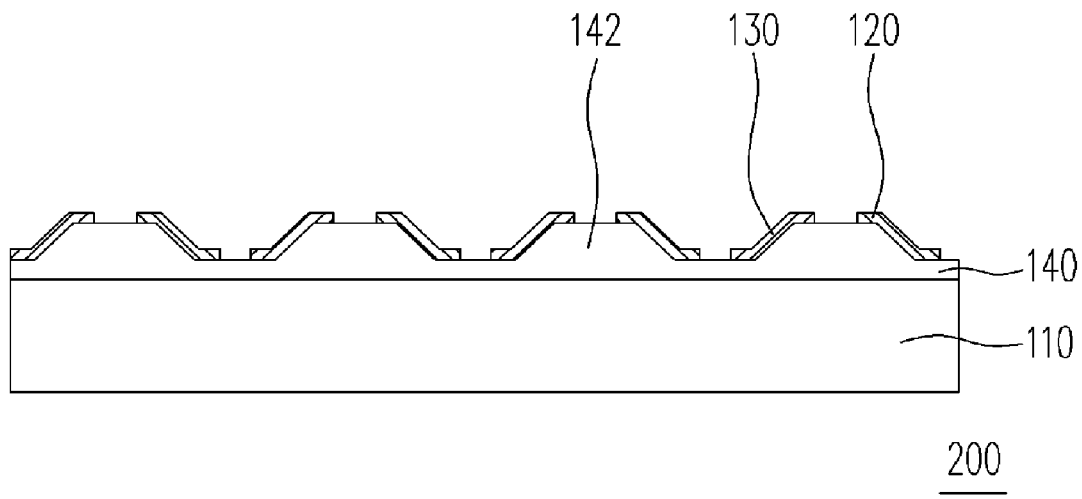
FIG. 5 is a schematic cross-sectional view of a UV-detector according to a third embodiment of the present invention.

FIG. 5 is a schematic cross-sectional view of a UV-detector according to a third embodiment of the present invention. Referring to FIGS. 5, 2A, and 2B, the UV-detector 200 of this embodiment includes a substrate 110, a first electrode 120, a second electrode 130, and an active layer 140. The first electrode 120 is disposed on the substrate 110, and has a plurality of first tips 122. The second electrode 130 is disposed on the substrate 110, and has a plurality of second tips 132. The second electrode 130 is electrically insulated from the first electrode 120. Additionally, the active layer 140 is disposed on the substrate 110, and is electrically connected to the first electrode 120 and the second electrode 130. The active layer 140 is suitable for absorbing UV and generating charges. The substrate 110, the first electrode 120, and the second electrode 130 have been described in the first embodiment, and thus will not be repeated hereinafter.

As shown in FIG. 5, the first electrode 120 and the second electrode 130 of this embodiment cover the active layer 140. More particularly, the active layer 140 of this embodiment has a plurality of striped protrusions 142. The first electrode 120 and the second electrode 130 cover a part of the surface of protrusions 142, and are respectively located on each side of a protrusion 142. In the UV-detector 200 of FIG. 5, the first electrode 120 and the second electrode 130 achieve the same capacity of absorbing and conducting positive and negative charges in the active layer 140 as that of FIG. 4A and FIG. 4B. Additionally, the first electrode 120 and the second electrode 130 may also be embedded in the active layer 140, to enhance the sensitivity of the UV-detector 200.

It should be noted that, the material of active layer 140 used in this embodiment may be the same as that of the substrate 110, for example, a photoelectric material, such as silicon, germanium, indium phosphide, gallium arsenide, or silicon carbide (6H—SiC), etc.

Fourth Embodiment

Figure 6:
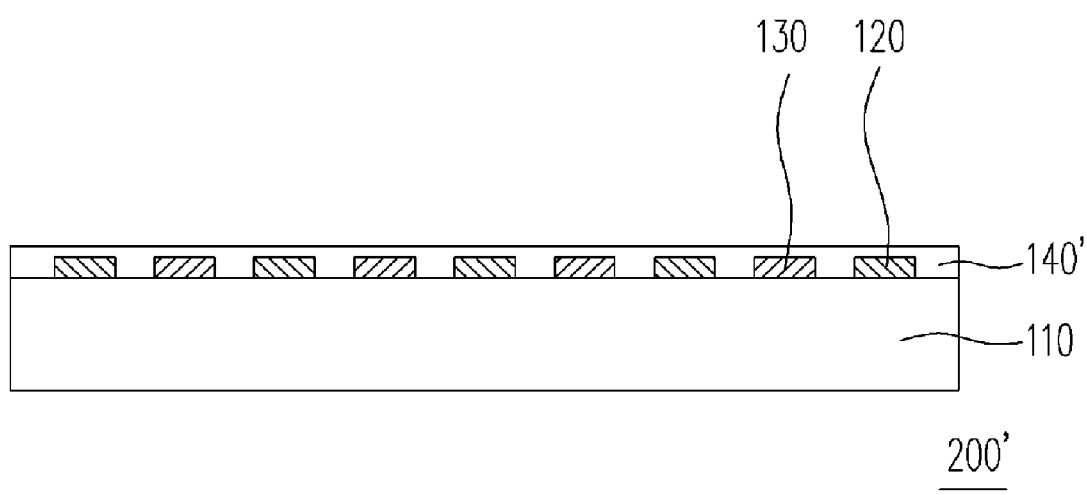
FIG. 6 is a schematic cross-sectional view of a UV-detector according to a fourth embodiment of the present invention.
Figure 7A:
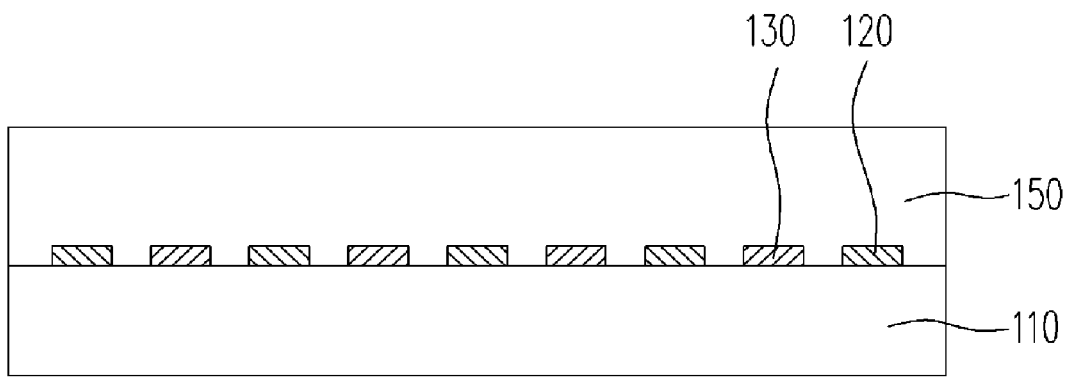
FIGS. 7A-7E are schematic cross-sectional views of a UV-detector according to a fifth embodiment of the present invention.
Figure 7B:
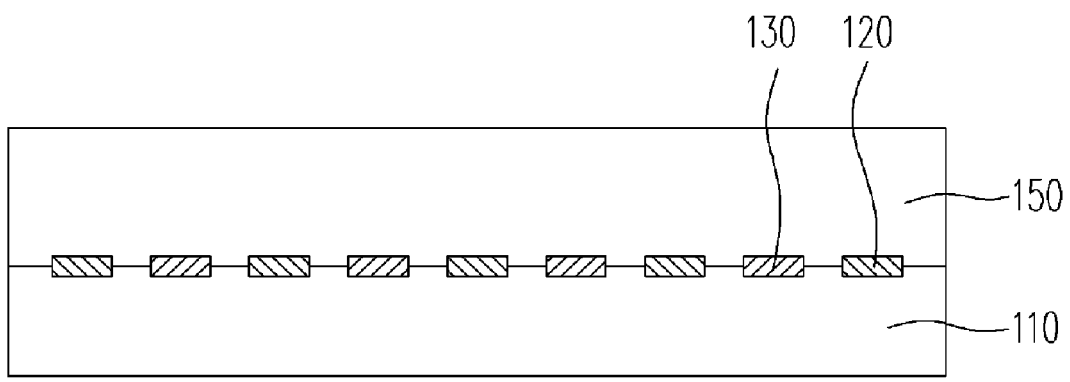
Figure 7C:
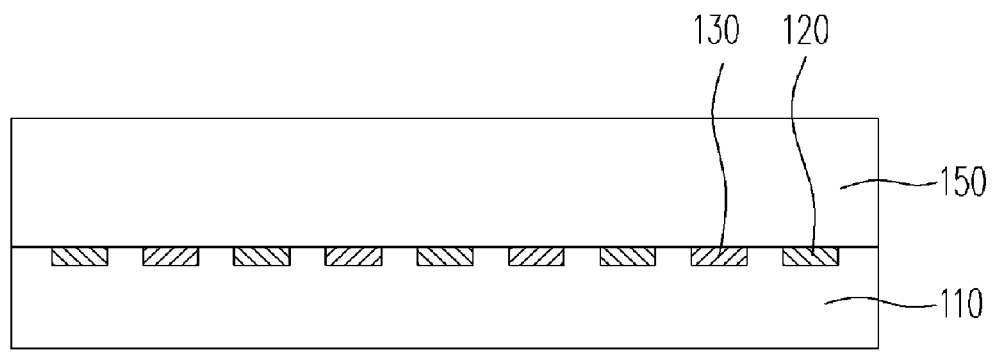
Figure 7D:
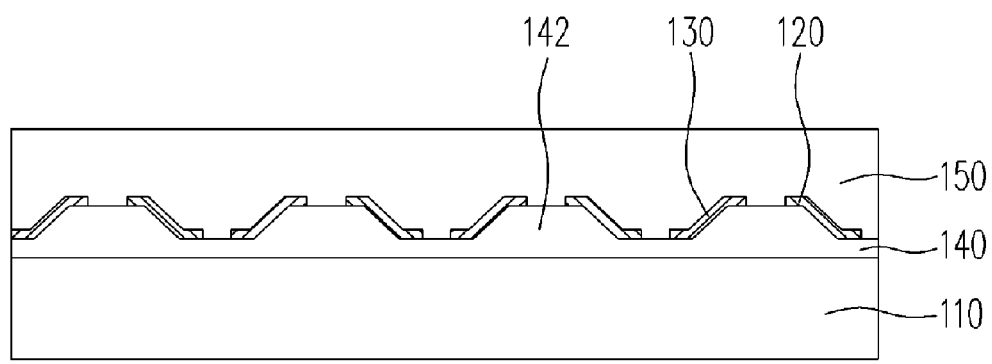
Figure 7E:
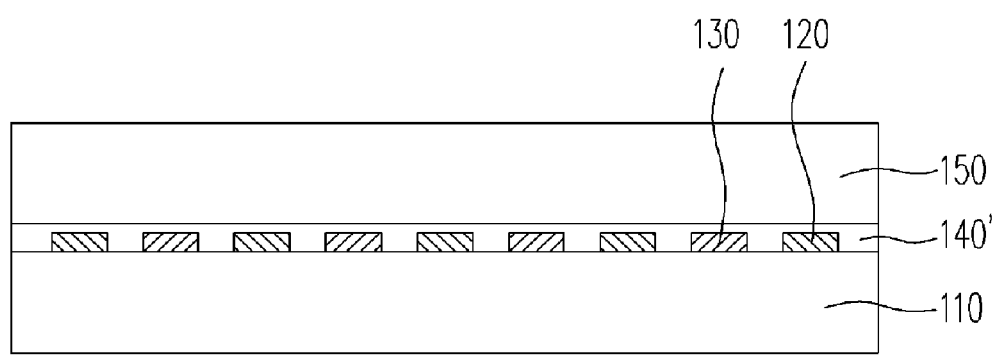
Figure 8A:
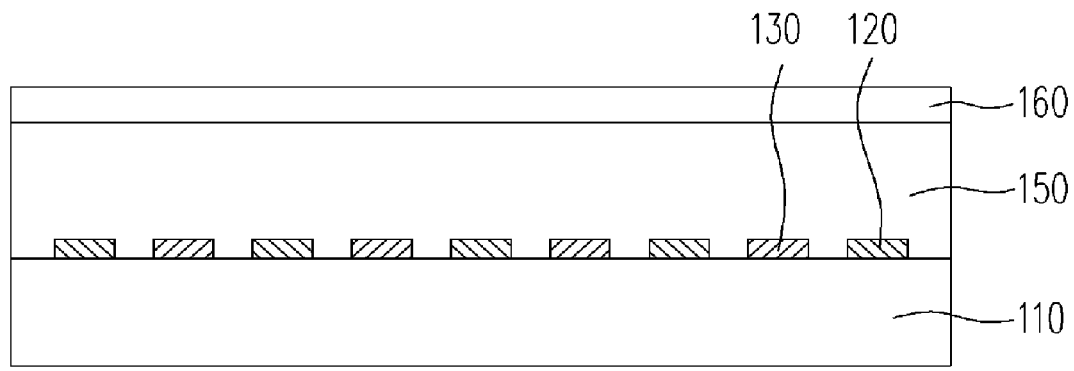
FIGS. 8A-8E are schematic cross-sectional views of a UV-detector according to a sixth embodiment of the present invention.
Figure 8B:
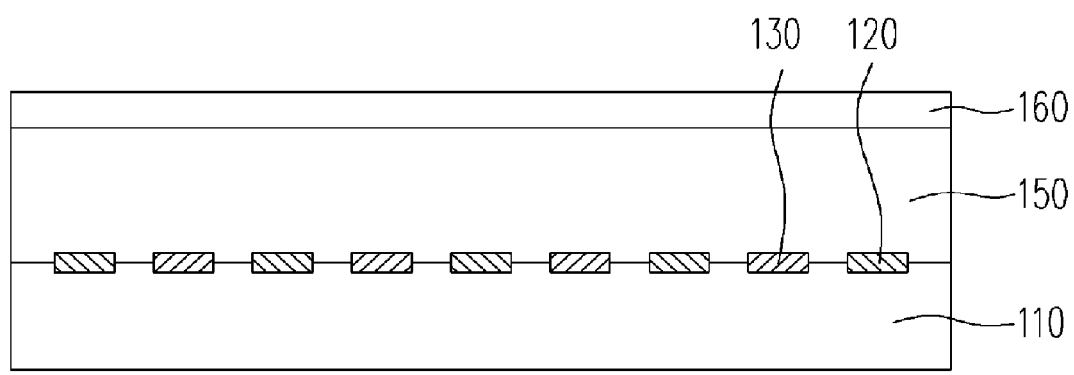
Figure 8C:
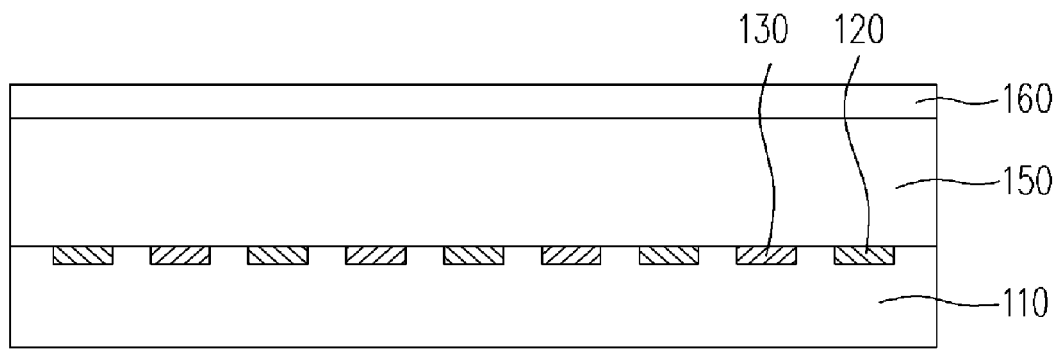
Figure 8D:
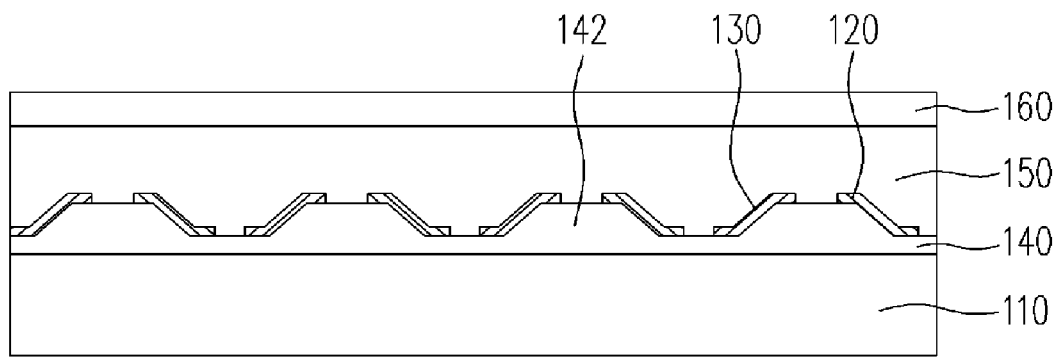
Figure 8E:
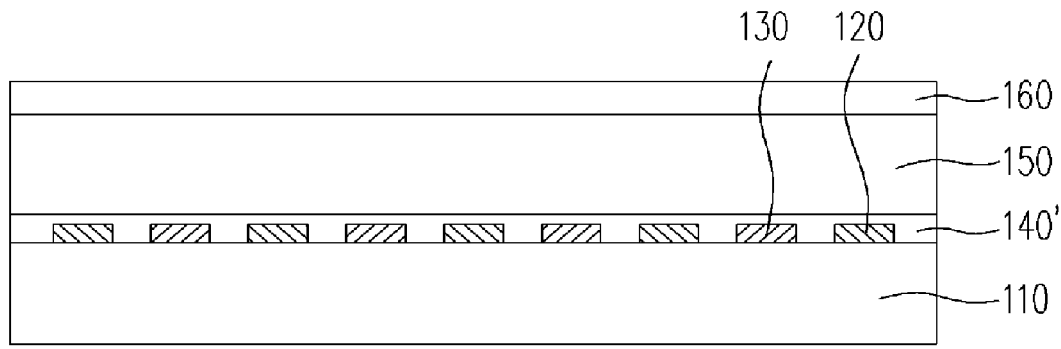

FIG. 6 is a schematic cross-sectional view of a UV-detector according to a fourth embodiment of the present invention. Referring to FIG. 6, the UV-detector 200' of this embodiment is similar to the UV-detector 200 of the third embodiment exception for the position and configuration of the active layer 140' in the UV-detector 200'.

As shown in FIG. 6, the active layer 140' of this embodiment covers the substrate 110, the first electrode 120, and the second electrode 130. Since the active layer 140' is used to cover the substrate 110, the first electrode 120, and the second electrode 130, the irradiation area of the UV-detector 200' of this embodiment is not limited by the first electrode 120 and the second electrode 130, and the photoelectric converting efficiency of the UV-detector 200' will be greatly enhanced. In other words, the design of the UV-detector 200' of this embodiment is regardless of whether the first electrode 120 and the second electrode 130 are made of transmissive materials. Thus, the material for the first electrode 120 and the second electrode 130 can be selected flexibly.

Fifth Embodiment

FIGS. 7A to 7E are schematic cross-sectional views of a UV-detector according to a fifth embodiment of the present invention. Referring to FIG. 7A to FIG. 7E, the UV-detector of this embodiment is similar to that of FIG. 1, FIG. 4A, FIG. 4B, FIG. 5, and FIG. 6 except for an additional an anti-reflection coating 150.

Sixth Embodiment

FIGS. 8A to 8E are schematic cross-sectional views of a UV-detector according to a sixth embodiment of the present invention. Referring to FIGS. 8A to 8E, the UV-detector of this embodiment is similar to that of FIGS. 7A to 7E except for an additional a filter 160 disposed on the anti-reflection coating 150. It should be noted that, since the UV-detector of this embodiment has a filter 160, it can be applied to measure ultraviolet light of different wavelengths, such as UV-A, UV-B, and UV-C.

In summary, the UV-detector of the present invention has at least the following advantages:

1. Electrodes in the UV-detector of the present invention can quickly and effectively conduct charges generated by photoelectric effects, thus the UV-detector of the present invention has desirable sensitivity and precision.

2. The manufacture of the UV-detector in the present invention is compatible with the current process, thus there no special equipment and process are required.

3. In the present invention, if a silicon substrate or other silicon-based substrates are used to manufacture the UV-detector, the manufacturing cost will be greatly reduced, and the UV-detector will be widely applicable to portable electronic devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An ultraviolet detector, comprising:
   a substrate having an active region for absorbing an ultraviolet light and generating charges;
   a first electrode electrically connected to the active region of the substrate and embedded in the substrate, wherein the first electrode has a plurality of first tips; and
   a second electrode electrically connected to the active region of the substrate and embedded in the substrate, wherein the second electrode has a plurality of second tips, and electrically insulated from the first electrode.

2. The ultraviolet detector as claimed in claim 1, wherein the substrate includes silicon, germanium, indium phosphide, gallium arsenide or silicon carbide.

3. The ultraviolet detector as claimed in claim 1, wherein the first and second electrodes are disposed on a surface of the substrate.

4. The ultraviolet detector as claimed in claim 1, wherein the first electrode comprises a spiral-shaped electrode with the first tips, and the second electrode comprises a spiral-shaped electrode with the second tips.

5. The ultraviolet detector as claimed in claim 1, wherein the first electrode comprises a plurality of ring-shaped electrodes electrically connected to each other and have the first tips, and the second electrode comprises a plurality of ring-shaped electrodes electrically connected to each other and have the second tips.

6. The ultraviolet detector as claimed in claim 1, wherein the first electrode comprises a finger-shaped electrode with the first tips, and the second electrode comprises a finger-shaped electrode with the second tips.

7. The ultraviolet detector as claimed in claim 1, further comprising an anti-reflection coating for covering the substrate, the first electrode, and the second electrode.

8. The ultraviolet detector as claimed in claim 7, further comprising a filter disposed on the anti-reflection coating.

9. An ultraviolet detector, comprising:
   a substrate;
   a first electrode disposed on the substrate, wherein the first electrode has a plurality of first tips;
   a second electrode disposed on the substrate, wherein the second electrode has a plurality of second tips, and electrically insulated from the first electrode; and
   an active layer disposed on the substrate and electrically connected to the first and second electrodes for absorbing an ultraviolet light and generating charges, wherein the first and the second electrodes are embedded in the active layer.

10. The ultraviolet detector as claimed in claim 9, wherein the substrate includes silicon, germanium, indium phosphide, gallium arsenide, or silicon carbide.

11. The ultraviolet detector as claimed in claim 10, wherein a material of the active layer is the same as that of the substrate.

12. The ultraviolet detector as claimed in claim 9, wherein the active layer covers the substrate, the first electrode, and the second electrode.

13. The ultraviolet detector as claimed in claim 9, wherein the first and second electrodes cover the active layer.

14. The ultraviolet detector as claimed in claim 9, wherein the first electrode comprises a spiral-shaped electrode with the first tips, and the second electrode comprises a spiral-shaped electrode with the second tips.

15. The ultraviolet detector as claimed in claim 9, wherein the first electrode comprises a plurality of ring-shaped electrodes electrically connected to each other and have the first tips, and the second electrode comprises a plurality of ring-shaped electrodes electrically connected to each other and have the second tips.

16. The ultraviolet detector as claimed in claim 9, wherein the first electrode comprises a finger-shaped electrode with the first tips, and the second electrode comprises a finger-shaped electrode with the second tips.

17. The ultraviolet detector as claimed in claim 9, further comprising an anti-reflection coating disposed on the active layer.

18. The ultraviolet detector as claimed in claim 17, further comprising a filter disposed on the anti-reflection coating.

* * * * *